US008548177B2

(12) United States Patent
Arnoult, Jr. et al.

(10) Patent No.: US 8,548,177 B2
(45) Date of Patent: Oct. 1, 2013

(54) METHODS AND SYSTEMS FOR SOURCE TRACKING

(75) Inventors: Kenneth M. Arnoult, Jr., Fairbanks, AK (US); Curt A. L. Szuberla, Fairbanks, AK (US); John V. Olson, Fairbanks, AK (US)

(73) Assignee: University of Alaska Fairbanks, Fairbanks, AK (US)

( * ) Notice: Subject to any disclaimer, the term of this patent is extended or adjusted under 35 U.S.C. 154(b) by 261 days.

(21) Appl. No.: 12/912,256

(22) Filed: Oct. 26, 2010

(65) Prior Publication Data
US 2012/0098704 A1 Apr. 26, 2012

(51) Int. Cl.
*G01S 5/22* (2006.01)
*G01S 5/06* (2006.01)
*G01S 11/14* (2006.01)
*G01S 11/10* (2006.01)

(52) U.S. Cl.
USPC .............................. 381/92; 342/465; 367/124

(58) Field of Classification Search
USPC ......... 342/387, 418, 463, 465; 367/124–125, 367/127, 129; 381/92; 348/14.16
See application file for complete search history.

(56) References Cited

U.S. PATENT DOCUMENTS
6,792,118 B2 * 9/2004 Watts ............................... 381/92

* cited by examiner

*Primary Examiner* — Jack W Keith
*Assistant Examiner* — Fred H Mull
(74) *Attorney, Agent, or Firm* — Ballard Spahr LLP

(57) ABSTRACT

Methods and systems are provided herein for signal source tracking. A signal emitted over time from a moving source is a collection of small sub-signals that were emitted by the source at different positions along its path. If the source is traveling at a slower speed than the signal, the sub-signals will arrive at a given sensor in the same order that they were released. By identifying the locations and times of the releases of several of these sub-signals, the path and velocity of the moving source can be estimated.

15 Claims, 14 Drawing Sheets

METHODS AND SYSTEMS FOR SOURCE TRACKING

BACKGROUND

Tracking a moving signal source by passive methods has been difficult due to the Doppler shift that is introduced into the observations of each sensor. In general, the size of the Doppler shift varies in time as the source moves, and the amount of Doppler shift is not the same in observations made from different locations. Therefore, Doppler shifting cannot simply be removed from the data. Methods for tracking a signal source that account for Doppler shifting are needed.

SUMMARY

The systems and methods provided overcome the complications of Doppler shifting in signal source tracking. The signal emitted over time from a moving source is a collection of small sub-signals that were emitted by the source at different positions along its path. If the source is traveling at a slower speed than the signal, the sub-signals will arrive at a given sensor in the same order that they were released. By identifying the locations and times of the releases of several of these sub-signals, the path and velocity of the moving source can be estimated.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
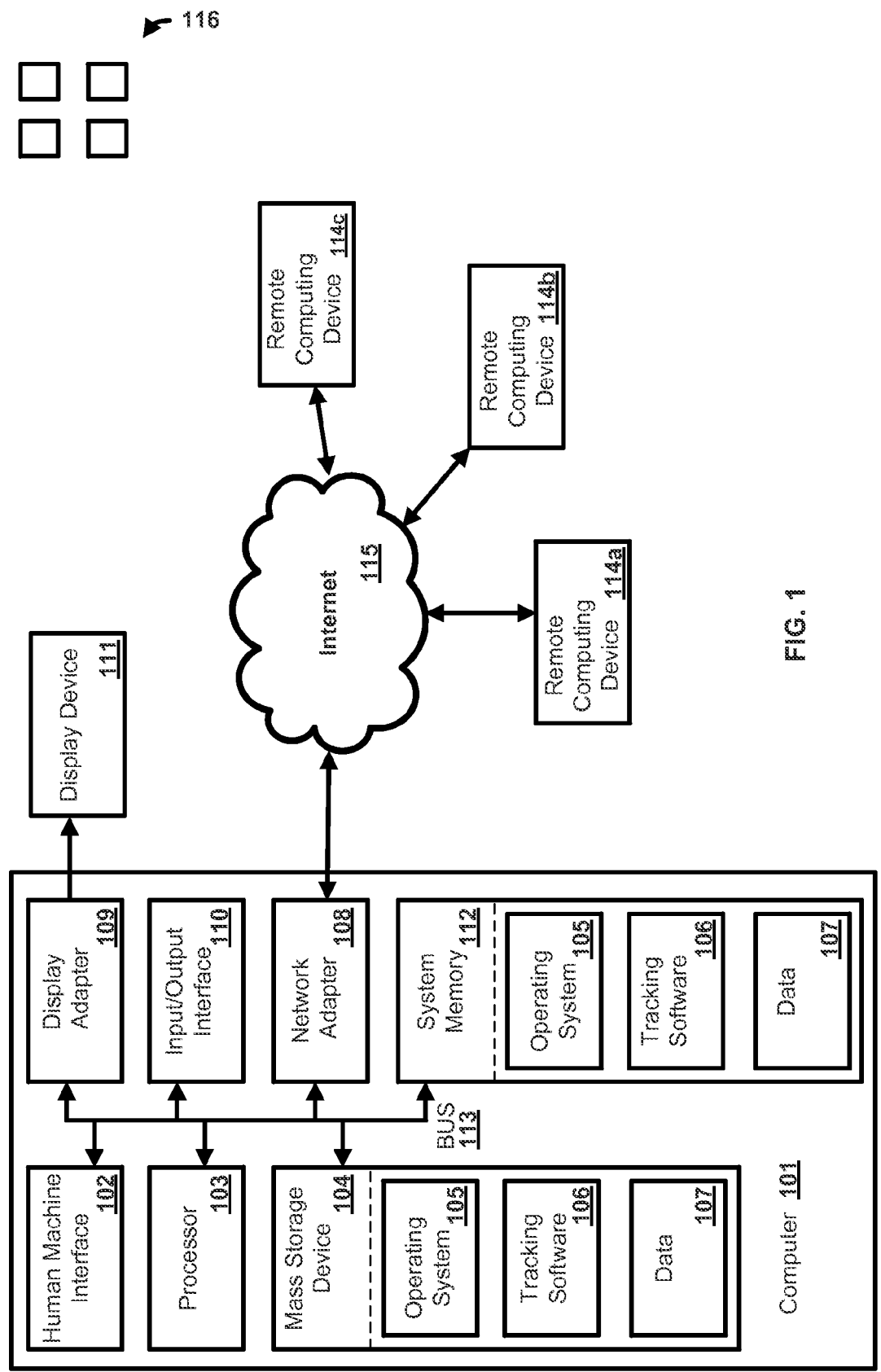
FIG. 1 is an exemplary operating environment.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

I. Systems

Provided are embodiments of systems for tracking a signal source. For example, in one aspect, the system can comprise a plurality of sensors, for example four sensors, (with no maximum limit) in communication with a tracking unit. More than four sensors can be in communication with the tracking unit. For example, the system can comprise 4, 5, 6, 7, 8, 9, 10, 11, 12, 13, 14, 15 sensors and the like. The tracking unit can comprise a sensor data receiving unit, a signal labeling unit, a location and time determination unit, and a path and velocity determination unit.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the Tracking Software 106 as illustrated in FIG. 1 and described below. In one exemplary aspect, the units can comprise a computer 101 as illustrated in FIG. 1 and described below.

FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, Tracking software 106, Tracking data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as Tracking data 107 and/or program modules such as operating system 105 and Tracking software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and Tracking software 106. Each of the operating system 105 and Tracking software 106 (or some combination thereof) can comprise elements of the programming and the Tracking software 106. Tracking data 107 can also be stored on the mass storage device 104. Tracking data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of Tracking software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In another aspect, sensors 116 can be located locally or remote from computer 101 and/or remote computing devices 114a,b,c. Sensor 116 can be any type of sensor capable of receiving a signal. For example, sensors 116 can be, thermal, electromagnetic, mechanical, chemical, optical, acoustic, motion, orientation, and the like, as are known to one of ordinary skill in the art. The sensors 116 can communicate received signals and other information related to received signals by any means known in the art. For example, sensors 116 can transmit data through a wired connection or through a wireless connection such as satellite, radio, cellular, and the like. Thus, the sensors 116 can communicate data to, and received data from, computer 101 and/or remote computing devices 114a,b,c.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

II. Methods

A. Source Tracker

Provided herein are methods for estimating both the path traversed by a moving source and the source's velocity along its path. The methods are passive techniques based on analysis of time-of-flight information that is deduced from signals received by a sensor array. This differs from active techniques such as radar that reflect a manufactured signal off of the object it is monitoring. Furthermore, the methods provided do not require that the signal be infrasonic. The methods are applicable to any wave field, including but not limited to, acoustic and electro-magnetic waves. The methods can be applied to sources traveling slower than the signal speed. The methods do not impose any restrictions on the configuration of the array of sensors or the number of sensors. Signal sources can be tracked when the signal source is outside the array and when the source is within the array. The methods account for constant uniform medium motion, for example, wind and currents.

The methods disclosed are based on several broad assumptions that greatly reduce mathematical complexity and computational time. It is assumed that at each instant, the source emits the same signal signature in all directions. It is further assumed that the speed of the source is less than the speed of signal propagation in the medium and that the source is much smaller than the aperture of the sensor array. It is also assumed that signals arrive at each sensor along direct "line of sight" paths from the source and that the signal medium is isotropic. Lastly, it is assumed that the segment of data containing the signal has a high signal to noise ratio (S/N). In the presence of noise, finding the parts of received signals that were emitted during the same events becomes a more difficult task. For instance, two sensors might not record the same number of zero crossings during a noisy interval. An analyst can find the corresponding parts within the sensors' received signals or the process can be automated.

Tracking a moving signal source by passive methods has been difficult due to the Doppler shift that is introduced into the observations of each sensor. In general, the size of the Doppler shift varies in time as the source moves, and the amount of Doppler shift is not the same in observations made from different locations. Therefore, Doppler shifting can not simply be removed from the data.

Figure 2:
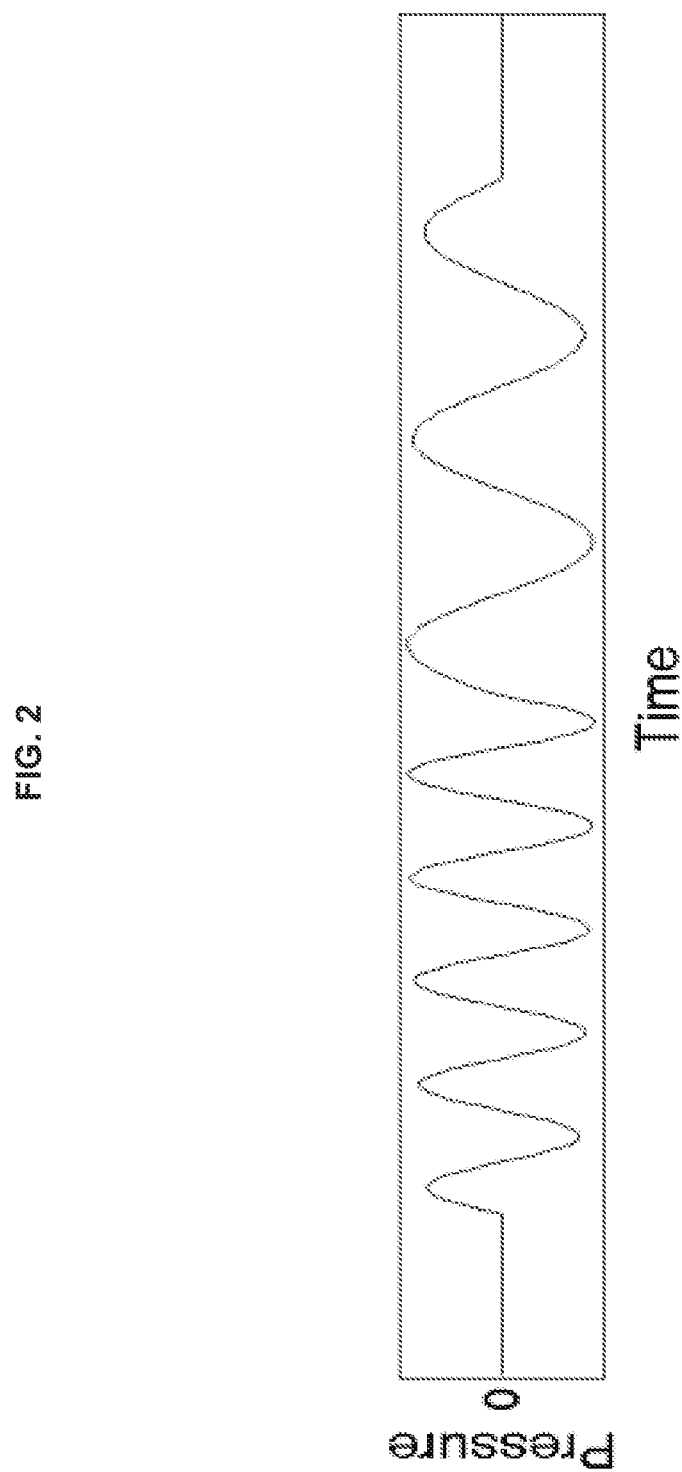
FIG. 2 is a representation of an acoustic signal received by a sensor from a moving source.

The methods provided overcome the challenges associated with Doppler shifting. The signal emitted over time from a moving source is a collection of small sub-signals that were emitted by the source in a series of events at different positions along its path. If the source is traveling at a slower speed than the signal, the sub-signals will arrive at a given sensor in the same order that they were released. By identifying the locations and times of the events that produced several of these sub-signals, the path and velocity of the moving source can be estimated. For example, if an ambulance were to drive through an array of acoustic sensors and turn on its siren for a brief period while in motion, one sensor of the array might receive a signal as seen in FIG. 2. FIG. 2 is a representation of an acoustic signal received by a sensor from a moving source. Every part of this received signal was released by the ambulance at a different position along its path.

Figure 3A:
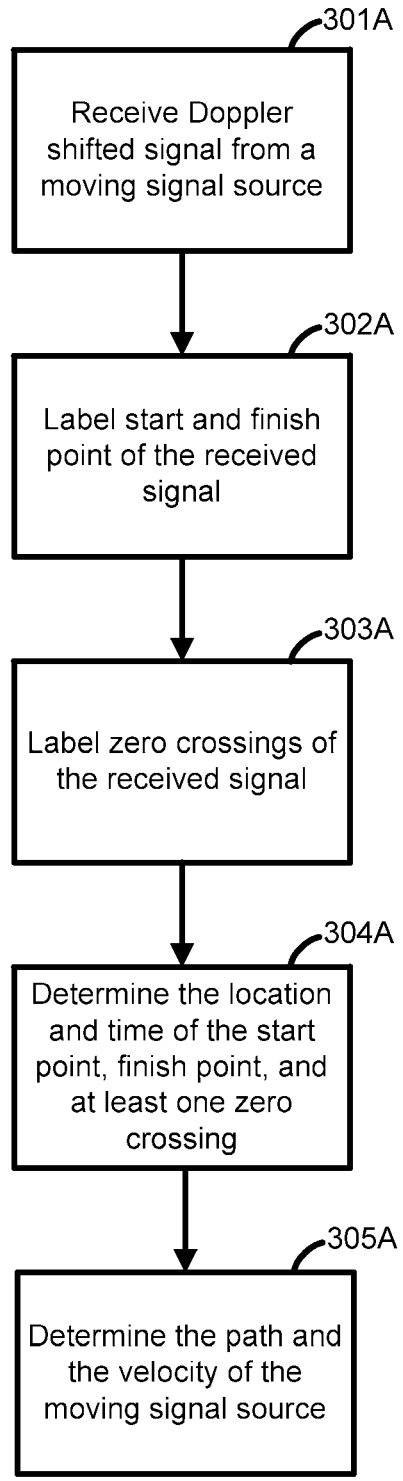
FIG. 3A illustrates exemplary steps of an embodiment of the methods.
Figure 4:
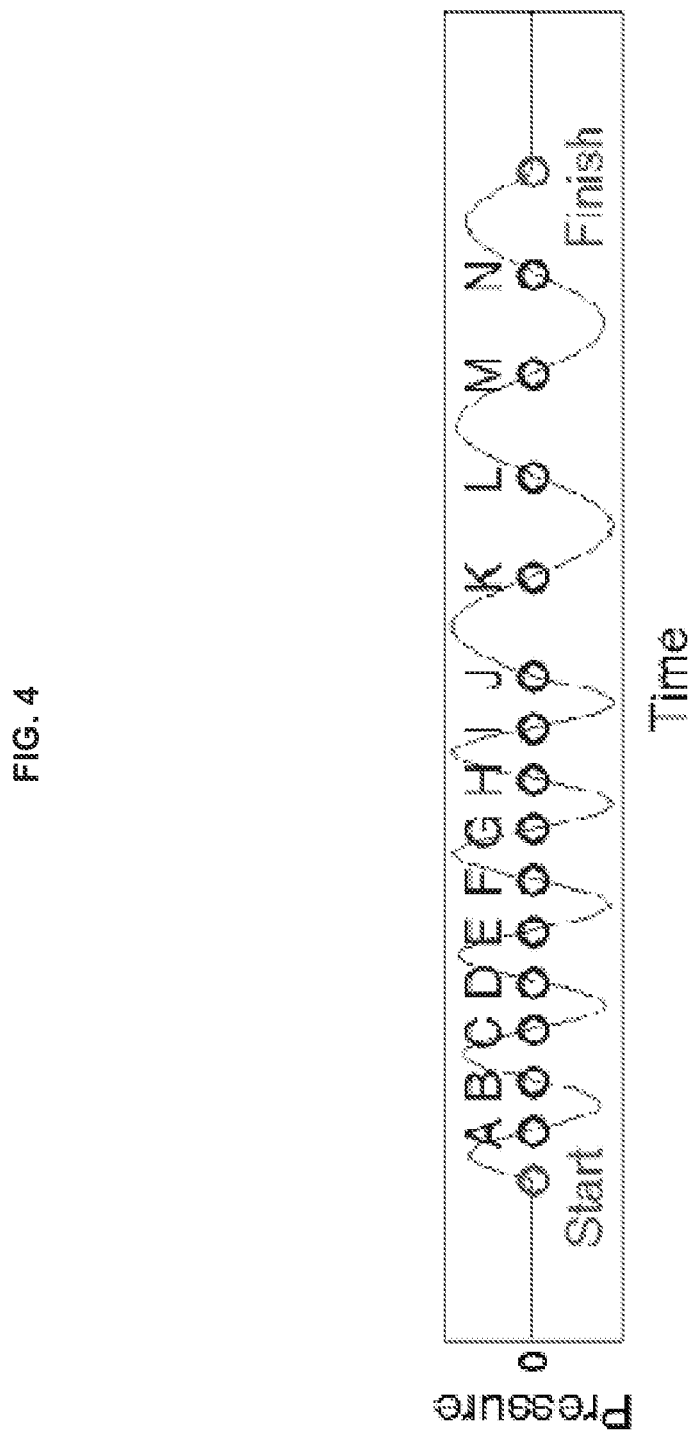
FIG. 4 is a labeled representation of an acoustic signal received by a sensor from a moving source.

FIG. 3A illustrates exemplary steps of an embodiment of the methods. At block 301A, a sensor array receives a Doppler shifted signal from a moving signal source. The start and finish point of the received signal is labeled at block 302A. FIG. 4 is a labeled representation of an acoustic signal received by a sensor from a moving source. Various parts of the signal are labeled and correspond to different events along an ambulance's path. For instance, the points labeled as "Start" and "Finish" in FIG. 4 correspond to the arrival of the parts of the signal that were released just after the ambulance's siren was turned on and just before the siren was turned off, respectively. Returning to FIG. 3A, at block 303A, the zero crossings of the received signal are labeled. Also labeled in FIG. 4 (A through N) are the places where the received signal crosses through the value of zero pressure ("zero crossings").

These "zero crossings" correspond to arrivals of parts of the signal that were released by the ambulance in a series of events at different locations along its journey while the siren was on. As long as the source is not traveling faster than the speed of the signal (the speed of sound in this example), these parts of the signal will arrive at each sensor in the array in the same order that they were released. However, the size of the Doppler shift will differ from sensor to sensor in the array. Zero crossings are useful for many reasons. One reason is that the slope of the received signal is usually most extreme at the zero crossings. This tends to minimize the error associated with measuring the times at which they occur. Another important reason is that the zero crossings are easily identifiable in the observations of all sensors. In the absence of noise and of other signals, each sensor should record the same number of zero crossings.

Figure 5:
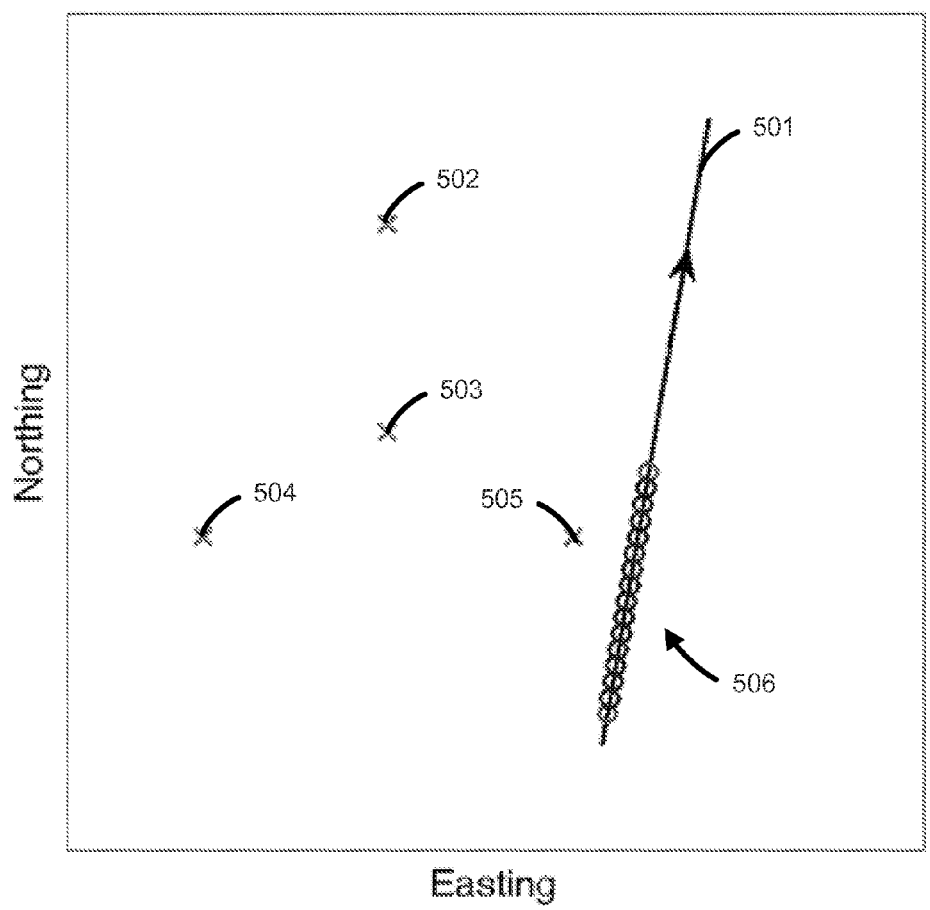
FIG. 5 illustrates the path of a signal source.

After repeating the same labeling scheme for the other sensors' measurements, it is possible to estimate the location and time of each event that produced each labeled part of the received signals. By knowing the locations of the sensors and the times that each sensor recorded the part of the signal labeled "Start," an estimate is made of the time and of the place from which that part of the signal was released. This same process is repeated sequentially for the other labeled parts of the received signals. This process results in a set of points that lie along the path of the ambulance (FIG. 5) and a set of times corresponding to when the ambulance was located at each point. From this the ambulance's average velocity between points can be calculated. FIG. 5 illustrates the path of a signal source (line 501) passing by an array of sensors (502, 503, 504, 505). Displayed along the path are a set of points (506) that are the determination of the source's path over a given segment.

Returning to FIG. 3A, the location and time of the start point, finish point, and at least one zero crossing is determined at block 304A. The more zero crossing points that have locations and times determined, the more accurate the path determination. At block 305A, the path and the velocity of the moving signal source is determined. The path and velocity is determined from the locations and times determined in block 304A. Methods by which event locations can be estimated, a "Source Locator," are described in U.S. patent application Ser. No. 11/291,497, herein incorporated by reference in its entirety. The Source Locator is able to provide an estimate of an event location and a signal speed, but not an estimate of an event time or a source velocity. However, an event time and a source velocity can be estimated once the results from the Source Locator have been provided.

Event times can be estimated by subtracting the time-of-flights of the signal's parts from the times the signal's parts arrived at a sensor (EQ. 1).

$$(\text{Event time}) = (\text{Time of detection}) - (\text{Time-of-flight}) \qquad (1)$$

The time of detection can simply be the time that any particular part of the signal (e.g. a "zero crossing") was detected. The time-of-flight (in the presence of a constant and uniform motion of the medium such as wind) for any particular part of the signal can be estimated by the following equation:

$$TOF = \frac{W^T X + \sqrt{(W^T X)^2 - (W^T W - c^2)(X^T X)}}{c^2 - W^T W} \quad (2)$$

where $$X = \begin{bmatrix} x_e - x_i \\ y_e - y_i \\ z_e - z_i \end{bmatrix}$$

$$W = \begin{bmatrix} w_x \\ w_y \\ w_z \end{bmatrix}$$

In the above equation $A^T$ represents the transpose of A, the signal speed is symbolized by the letter "c," the location of the event is denoted by $(x_e, y_e, z_e)$, the location of the $i^{th}$ sensor is denoted by $(x_i, y_i, z_i)$, and the vector components of the winds (or any other constant and uniform medium motion) are represented by $w_x$, $w_y$, and $w_z$. Note that if no wind is present all of the wind's vector components ($w_x$, $w_y$, and $w_z$) take on the value of zero, and EQ. 2 reduces to the equation "time=distance/speed." EQ. 2 can also be applied to 2-D (planar) cases by setting the $3^{rd}$ element in both the W and X vectors equal to zero. The time of an event can be estimated for each sensor in the array, thus creating a distribution of event time estimates. This distribution can be reduced to a single value by way of standard statistical methods (e.g. mean, median, etc.).

The source's velocity can be estimated from the event times and the event locations. For example, the average velocity of the source between any two events can be estimated by dividing the displacement between the events by the time elapsed between events. For any two events j and k, the average velocity of the source in moving from j to k can be expressed in the following equation:

$$\vec{v}_{av} = \frac{\vec{r}_k - \vec{r}_j}{t_k - t_j} \quad (3)$$

where $\vec{r}_k$ and $\vec{r}_j$ represent the position vectors of events k and j, respectively, and $t_k$ and $t_j$ represent the times of events k and j, respectively. A method to estimate the source's velocity as a function of time is to repeatedly apply EQ. 3 to all consecutive events.

Figure 3B:
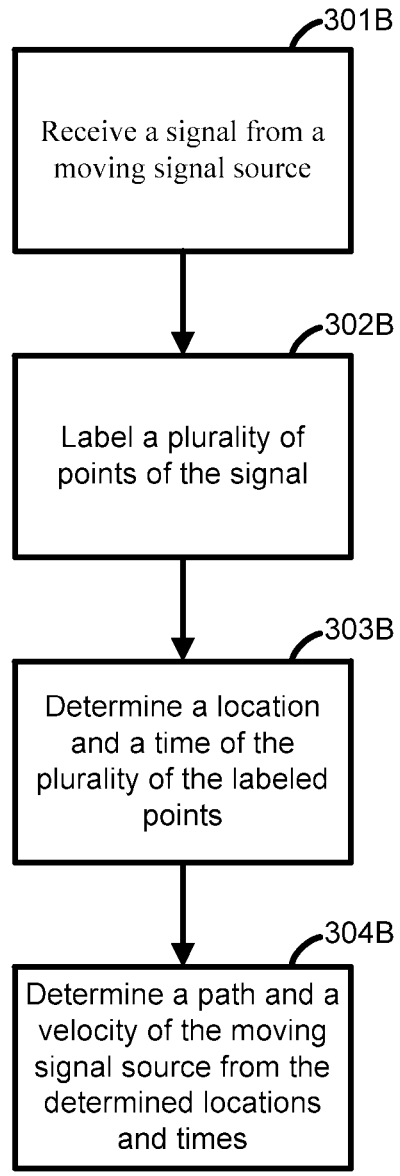
FIG. 3B illustrates exemplary steps of another embodiment of the methods.

FIG. 3B illustrates exemplary steps in another embodiment of the methods for signal tracking. At block 301B, a signal from a moving signal source can be received. Then, at block 302B, a plurality of points of the signal can be labeled. A location and a time of the plurality of the labeled points can be determined at block 303B. Finally, a path and a velocity of the moving signal source can be determined at block 304B from the determined locations and times. The signal can be, for example, a Doppler shifted signal. The signal can also be, for example, an acoustic signal, electro-magnetic signal, and the like.

Labeling the plurality of points of the signal can comprise labeling a start point, a finish point, and at least one zero crossing. The at least one zero crossing can be a point where the received signal crosses through a value of zero pressure.

The signal can be received at a sensor array. The sensor array can comprise a plurality of sensors, for example, four sensors. The methods can further comprise repeating steps 301B-303B for each sensor in the sensor array.

Determining a location and time of the labeled points can comprise determining a location and time for each of the start point, the finish point, and the at least one zero crossing.

B. Source Locator i. Methods

Figure 6:
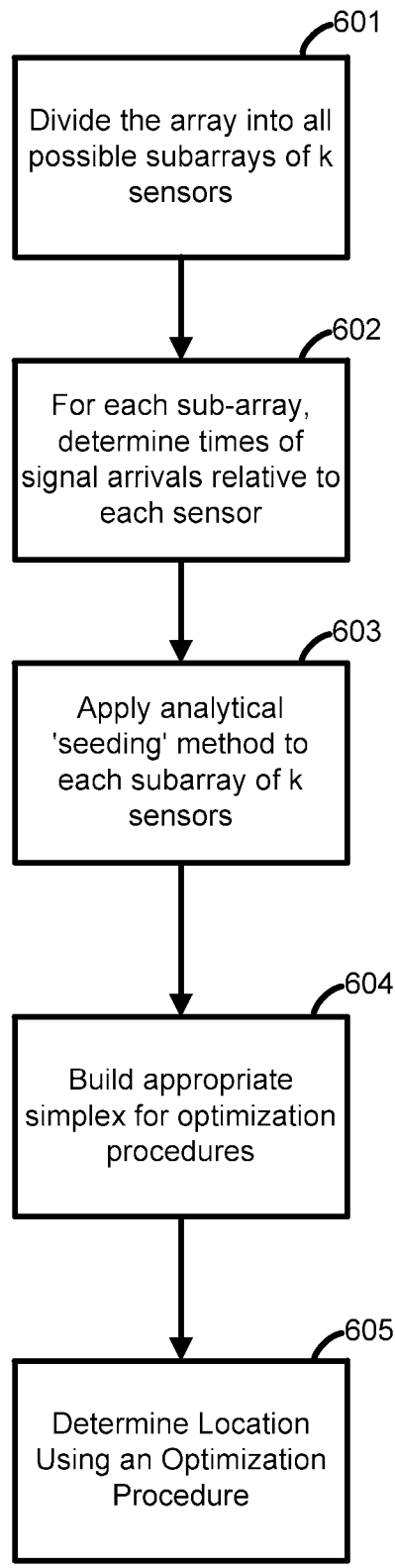
FIG. 6 illustrates exemplary steps in a method for determining a location and a time of a signal source.

An example of a Source Locator is found in U.S. Pat. No. 7,746,225, incorporated herein by reference in its entirety. FIG. 6 illustrates exemplary steps in a method for determining a location and a time of a signal source using an array of four sensors. The method can receive as input, geographic coordinates of sensor locations, where n is the number of sensors. The geographic coordinates can be in a matrix organized as a row of column vectors containing the easting and northing of each sensor relative to some origin. Another input can be the column vector of time delays, given by EQ. 4.

The method begins by dividing the array of n sensors into all possible sub-arrays of k sensors at block 601. Then the method determines the time delays between the signal's arrival at all non-redundant pairs of sensors within each sub-array at 602. The time delay between a part of the signal's arrival at any 2 sensors i and j ($\Delta t_{ij}$) can be calculated directly by subtracting the times of detection as measured by sensors i and j. In order to better approximate the times of detection, a standard curve fitting technique can be applied. This process is repeated for all non-redundant pairs of sensors in the array and the results are recorded in a column vector, τ, given by the following equation:

$$\tau = [\Delta t_{12} \Delta t_{13} \ldots \Delta t_{(1)(n)} \Delta t_{23} \ldots \Delta t_{(2)(n)} \ldots \Delta t_{34} \ldots \Delta t_{(n-1)(n)}]^T, \quad (4)$$

where $X^T$ represents the transpose of the vector X. Note that for an n-element array the dimension of the vector is [n(n−1)/2,1].

Then the method applies an analytical 'seeding' method at block 603, described in further detail below. The purpose of the seeding method is to provide a starting point, or seed, from which an optimization procedure can later be launched. However, since the seeding method is analytical, it can only be applied to a very specific number of sensors, k. For example, k can be 4. Therefore, the seeding method is applied to every combination of k sensors within the original n-sensor array. The number of combinations containing k sensors that can be constructed from n sensors is $$\frac{n!}{k!(n-k)!}.$$

The value of k will depend on the characteristics of the array and the medium; this topic will be discussed later in further detail.

Estimations of source location are determined for all possible k-sensor groups within an array of n sensors. Since, in general, the time delays of EQ. 4 can each be measured quantities, for any given group of k sensors, there can be k unique realizations of the seeding method locations, by taking, in turn, each of the k sensors to be the reference sensor of the group. Each of the seeding method solutions can be calculated using straightforward linear algebraic techniques, culminating in the solution of either a cubic or quartic equation in the trace speed squared. There exists the possibility of having as many as three real solutions to the cubic equation and four real solutions to the quartic equation. In the case that there is no noise present, at least one location solution from all solution sets will be identical. However, in practice noise is ubiquitous, so for an array of n sensors, there can be as many as $$3\left(\frac{n!}{(k-1)!(n-k)!}\right)$$

solutions from the variants of the seeding methods that solve a cubic equation and $$4\left(\frac{n!}{(k-1)!(n-k)!}\right)$$

solutions from the variants that solve a quartic solution. For certain groups of k sensors, only a single real solution can be found among the three-fold or four-fold roots. These solutions from the sub-arrays can be used to initiate an optimization procedure which estimates a solution from all sensors in the array.

The Nelder-Mead optimization procedure, as known in the art, is practical for this purpose due to its independence of derivatives of merit functions (the functions for which maximum values are being sought). However, Powell's method, as known in the art, can also be used. Conjugate- or variable-metric gradient methods depend on derivatives of the merit function and are not as convenient for this application.

At block 604, using a kernel density technique, the probability functions of the range, azimuth and trace speed can be estimated for an ensemble of single-solution results of the analytical seeding method. From each of these probability functions, their full-width half-maximum and median values can be estimated and used to construct a set of vertices for a seed simplex appropriate for the parameter space. For example, in the case of a 2-D array with static medium, the seed simplex derived from these quantities can be an irregular tetrahedron in $(r, \theta, c)$ space. Its base can be given by the triangle with vertices: $(r_{low}, \theta_{med}, c_{low})$, $(r_{high}, \theta_{low}, c_{low})$, $(r_{high}, \theta_{high}, c_{low})$; and its apex is given by $(r_{med}, \theta_{med}, c_{med})$.

Once the seed simplex derived from the analytical seed method is determined, the method can determine a localization by using an optimization procedure at block 605. The optimization procedure can be, for example, a Nelder-Mead minimization. By way of example, and not limitation, the method can perform a Nelder-Mead minimization on the "distance" $\delta\tau$ in a $[n(n-1)/2]$-dimensional space between the observed delay vector (EQ. 4) and a calculated delay vector, under model assumptions, arising from each of the vertices of the simplex. Since the mathematics of the Nelder-Mead method are more efficiently carried out in Cartesian space, each of the simplex vertices is first converted to Cartesian space.

The distance between two d-dimensional vectors a and b is generally defined according to the relation $$L_N = \left(\sum_{i=1}^{d}(a_i - b_i)^N\right)^{\frac{1}{N}} \qquad (5)$$

Typically, distance is defined according to the L2 norm, or the Euclidean distance. The minimization carried out by the method can use the L1 and L∞ norms. The L1 norm modifies the definition of EQ. 5 slightly $$L_1 = \left|\sum_{i=1}^{d}(a_i - b_i)\right| \qquad (6)$$

L1 can be used as a norm as it is less sensitive to outliers than the traditional L2 norm. Via EQ. 5 it can be seen that the L∞ norm replaces the sum by the maximum difference between any coordinate pairs in the vectors a and b. This technique is used because it is extremely computationally efficient and tends to give approximately normally distributed results for source localizations.

Each of the L1 and L∞ norm realizations of $\delta\tau$ is represented by a simplex that has contracted around some local minimum in Cartesian space representing a localization which gives a delay vector that is within some tolerance of the observed delay vector.

The output of the method can be three-fold: the two resulting simplexes from the L1 norm and L∞ norm based minimizations of $\delta\tau$ and the mean localization derived from the results of the seeding method. From among these an operator can decide which is a valid localization, or can use the results in concert to decide whether or not a realistic localization has been achieved.

It is important to emphasize that even though a search is conducted for locations in space and for signal trace speeds, this is not a grid search over a predetermined set of points. The minimization algorithm can be based upon a Nelder-Mead technique and can utilize a simplex of points which expands, contracts, and reflects through the space spanned by source location ([x, y] or [x, y, z]), signal trace speed (c), and, if needed, velocity of medium drift ($[w_x, w_y]$ or $[w_x, w_y, w_z]$) until the point that minimizes $\delta\tau$ is found to within a specified tolerance. The method can find a minimum in $\delta\tau$ within a tolerance of $10^{-10}$ in one to two seconds for an array of 10 sensors or less. Once a location is determined, range and azimuth are calculated relative to the origin of the array coordinate system (although these results can be transformed into any coordinates desired).

A Monte Carlo approach can be used to estimate the uncertainties inherent in any source localization that uses an arbitrary array. In this approach, a synthetic data set is generated that simulates the sensor records, across the array, for a signal that was generated from a known source location. These synthetic signals may be calculated directly from time-of-flight considerations from the source to each sensor. For a given synthetic signal, an ensemble of like signals is generated by corrupting the calculated signal with random noise. A source localization is performed for each data set in the ensemble. A statistical analysis of the resulting ensemble of localizations provides an estimate of the uncertainty in the locator method. By varying the noise amplitude and characteristics, these uncertainties can be expressed as functions of those parameters. The locator method is insensitive to the actual synthetic signal characteristics (e.g., impulsive or periodic).

ii. Analytical 'Seeding' Method

The analytical seeding method is currently able to be applied to six cases: (i) a planar (2-D) array with a static medium, (ii) a planar (2-D) array with a medium drifting at an unknown, constant velocity, (iii) a planar (2-D) array with a medium drifting at a known constant velocity, (iv) a spatial (3-D) array with a static medium, (v) a spatial (3-D) array with a medium drifting at an unknown, constant velocity, and (vi) a spatial (3-D) array with a medium drifting at a known, constant velocity. For each case, a slightly different variant of the seeding method is used. However, each variant is derived from the same fundamental approach, but is constructed to be mathematically compatible with the above mentioned six cases.

Figure 7:
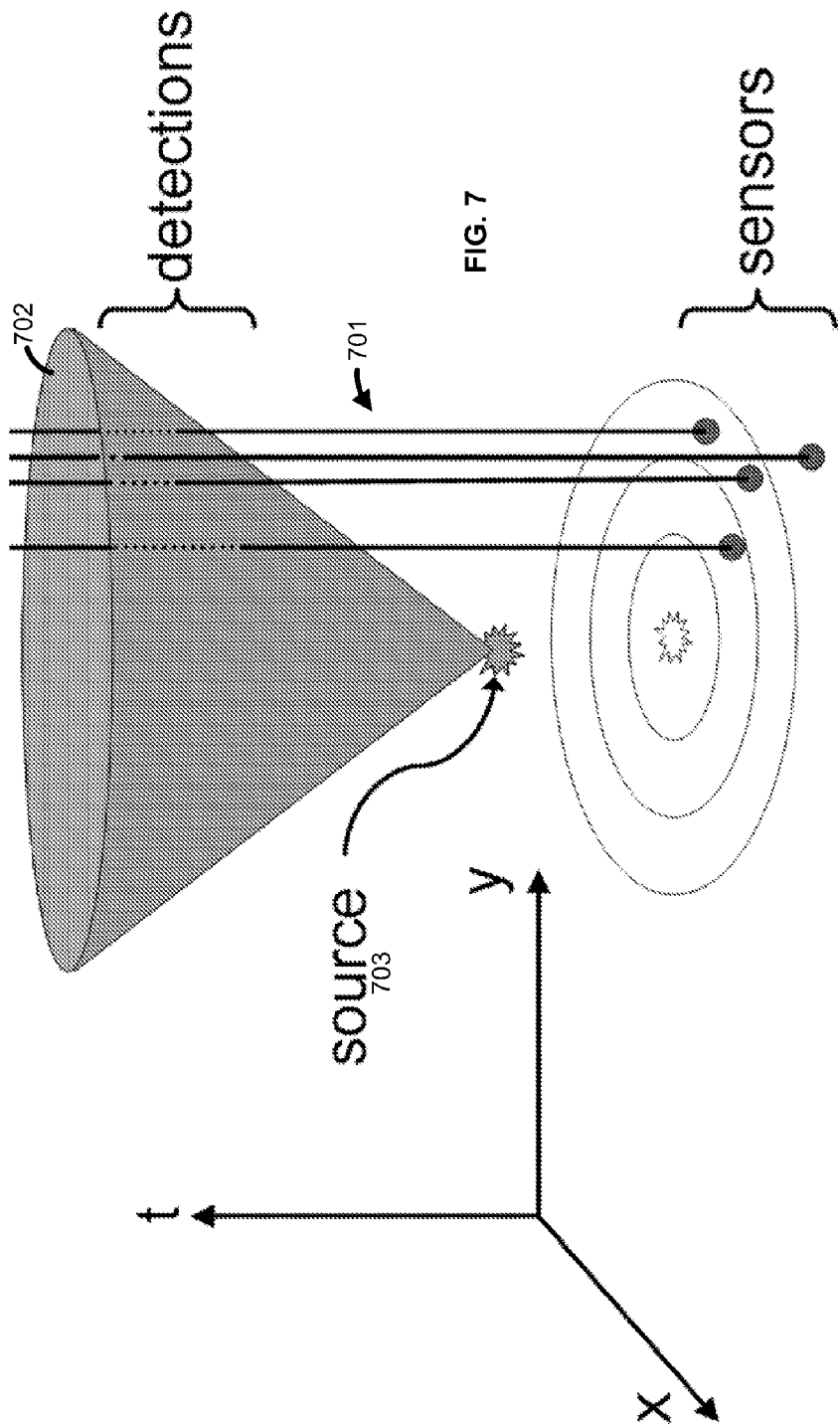
FIG. 7 is a space-time diagram depicting the detection of a signal by a planar array of four sensors.

For the sake of clarity, the fundamental approach of the seeding method is discussed with regards to case (i) as portrayed in FIG. 7. FIG. 7 is a space-time diagram depicting the detection of a signal by a planar array of four sensors. In this case, with a planar array and static medium, the signal propagating from a point source has the shape of a right, circular cone when plotted in (x,y,t) space. Since the sensors are at fixed positions, they are plotted in (x,y,t) space as vertical lines parallel to the time axis. Detections occur where and when the vertical lines 701 (sensors) intersect the cone 702 (signal). The detections can then be used to solve the equation of the cone and thus locate the source 703 of the signal. This is an approach of the analytical 'seeding' method as applied to a planar array in a static medium. Since four points are necessary to determine a right, circular cone uniquely, this problem reduces to a simpler mathematical problem: given four points (detections), find the equation of the cone that passes through them. Once solved, the vertex of the cone gives the location of the source $(x_s, y_s)$ and the time the signal was released $(t_s)$; the slope of the cone gives the signal's trace speed (c). This solution obtained from four sensors of an array can then be used as a starting point, or 'seed', for an algorithm which searches the neighboring region for the solution that best matches the time delays between detections of all sensor pairs in the array. It should be noted that on occasion, more than one cone exists that can pass through four points. In these cases, information from other sensors in the array is needed to determine a unique solution.

C. Alternative Methods of Operation

The Source Locator can be modified to make it more efficient as a sub-routine within the tracking method presented herein. For example, since the tracking method uses times of detection instead of time differences between detections, the "seeding method" can be applied only once to each sub-array instead of multiple times. Also, for an array of n sensors, the optimization process can use only a vector of n elements of time measurements within its merit function instead of a vector of $$\frac{n(n-1)}{2}$$

elements of time difference measurements. Another alternative in the case when the "seeding method" is only called once within the Source Locator (this occurs when there are only the minimum number of sensors needed to locate a source), is to return the estimate of the event time directly from the "seeding method" instead of re-calculating it again after the Source Locator has been executed.

D. Improvements to Source Tracker

Improvements to the methods and systems for source tracking disclosed in U.S. Pat. No. 7,710,827, incorporated herein by reference in its entirety, allows the methods to be applied to noisy data with less dependence on user-provided information. While the original methods for tracking a moving source could be applied to noise-free data, such applications were awkward and time consuming.

i. Noise-Free Data Case

Assume that multiple stationary sensors at different, known locations record a signal being transmitted by a moving source. If the amount of noise in the recorded data is negligible compared to the amplitude of the signal, the data can be considered noise-free. In this case, if the source tracking methods are provided with one set of times indicating when the same event was recorded by each of the sensors, the methods can find other sets of times that correspond to other events. For each set of times, the Source Locator can estimate the location of the corresponding event. The resulting set of locations then reveals the trajectory of the moving source.

Figure 8:
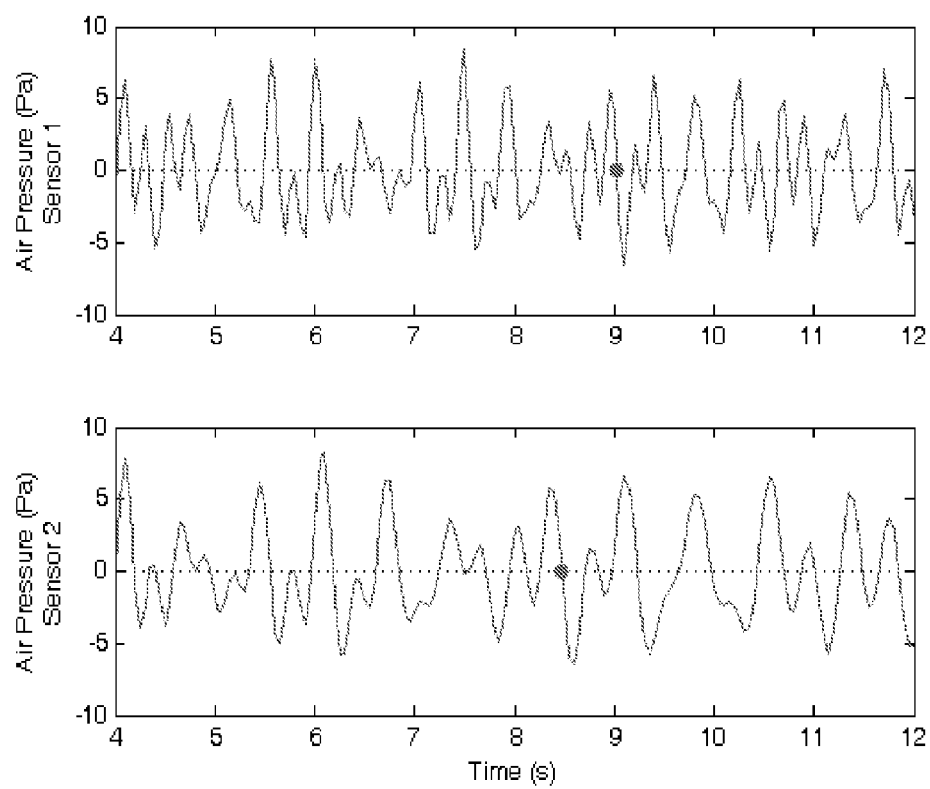
FIG. 8 displays a signal from a moving source as it might be recorded by two different sensors.

For example, FIG. 8 displays a signal from a moving source as it might be recorded by two different sensors. The data are noise-free, but the two time series are not identical due to the result of the Doppler effect. The large dot indicates where the same event was recorded by both sensors. Once one event has been identified, others can easily be identified if noise is absent. One way to identify other events is by matching consecutive zero-crossings (times at which the recorded time series cross through the zero-pressure line [dotted line]). However, if noise is present, there is a high probability that consecutive zero-crossings can no longer be used to identify events.

FIG. 8 is an example of a signal emitted by a moving source as recorded by two stationary sensors. The recordings are noise-free, but are not identical due to the result of the Doppler effect. The large dot indicates where the same event was recorded by both sensors.

ii. Noisy Data Case

One way to track a moving source given noisy data is by first having the user visually inspect the data and identify a set of times that correspond to a set of events being recorded by all sensors. The Source Tracker can then approximate the path of the moving source by estimating the location of each event. However, this can be a painstaking exercise for the user. In another aspect, computer software can be used that can identify such a set of times, thus replacing the need for a user in performing this task.

Improvements to the Source Tracker allow for automatic identification of the times of other corresponding events if the user or the software can provide the first one. This improvement allows a computer to identify corresponding events within noisy data instead of relying on the user.

iii. Overview—Doppler Estimation Improvements

The steps taken in the improved methods for source tracking to automatically identify other corresponding event times can comprise:

1) Creating a window in each time series centered on initial event times and with a time duration defined by software or by the user.
2) Estimating the amount of Doppler shift present in the data in each window relative to the most red-shifted data. This step is explained in more detail below.
3) Resizing the windows such that the windows containing the most blue-shifted data shrink the most, but the window containing the most red-shifted data does not change in size. The data in each resized window can then be resampled such that the number of data points in each window is the same. This step effectively removes the presence of Doppler shifting from the data in the windows.
4) Cross-correlating the data in the resized windows to estimate the time differences of arrival of the event between each pair of sensors.
5) Moving the resized windows forward in time by a step size defined by software or by the user. The centers of the windows should have time differences that reflect the result of step 4.
6) Repeat steps 2 through 5 until the end of the data set is reached.

7) Repeat steps 2 through 5 again, but move the windows backward in time (starting from the initial event times from step 1), until the beginning of the data set is reached.
8) Using the time differences estimated at each iteration of the windows, estimate the location of the moving source at different points along its path.

1. Estimating Doppler Shift

For the case of stationary sensors, a stationary medium (e.g. air), and a moving source, the frequency of the signal that arrives at a sensor (f′) can be written in terms the original frequency transmitted by the source (f) as follows:

$$f' = \left(\frac{1}{1 + \frac{\vec{v} \cdot \hat{r}}{c}}\right) f$$

where:
f is the frequency of the original signal
f′ is the frequency of the Doppler shifted signal that arrives at a sensor
$\vec{v}$ is the velocity of the moving source
$\hat{r}$ is the unit vector pointing from a sensor to the moving source
c is the signal speed in the medium (e.g. speed of sound in air)

Taking a logarithm of both sides of the equation yields:

$$\log(f') = \log\left(\frac{1}{1 + \frac{\vec{v} \cdot \hat{r}}{c}}\right) + \log(f)$$

Applying this equation to data recorded by two sensors reveals that the difference between the log of the recorded frequencies can be expressed in the following way:

$$\log(f'_2) - \log(f'_1) = \log\left(\frac{1 + \frac{\vec{v} \cdot \hat{r}_1}{c}}{1 + \frac{\vec{v} \cdot \hat{r}_2}{c}}\right)$$

where:
$f'_1$ is the frequency of the Doppler shifted signal that arrives at sensor 1
$f'_2$ is the frequency of the Doppler shifted signal that arrives at sensor 2
$\hat{r}_1$ is the unit vector pointing from sensor 1 to the moving source
$\hat{r}_2$ is the unit vector pointing from sensor 2 to the moving source If it is assumed that $\vec{v} \cdot \hat{r}_1$, $\vec{v} \cdot \hat{r}_2$, and c are nearly constant over "small" durations of time, the term on the right side of the equation can also be approximated as a constant over "small" time intervals. This means that the ratio between the amount of Doppler shifting present in two time series can be estimated by calculating the difference between the log of the recorded frequencies. This difference can be estimated by cross-correlating the log of the Fourier transforms of "small" segments of the two time series.

2. Example of Estimating Doppler Shift

Figure 9:
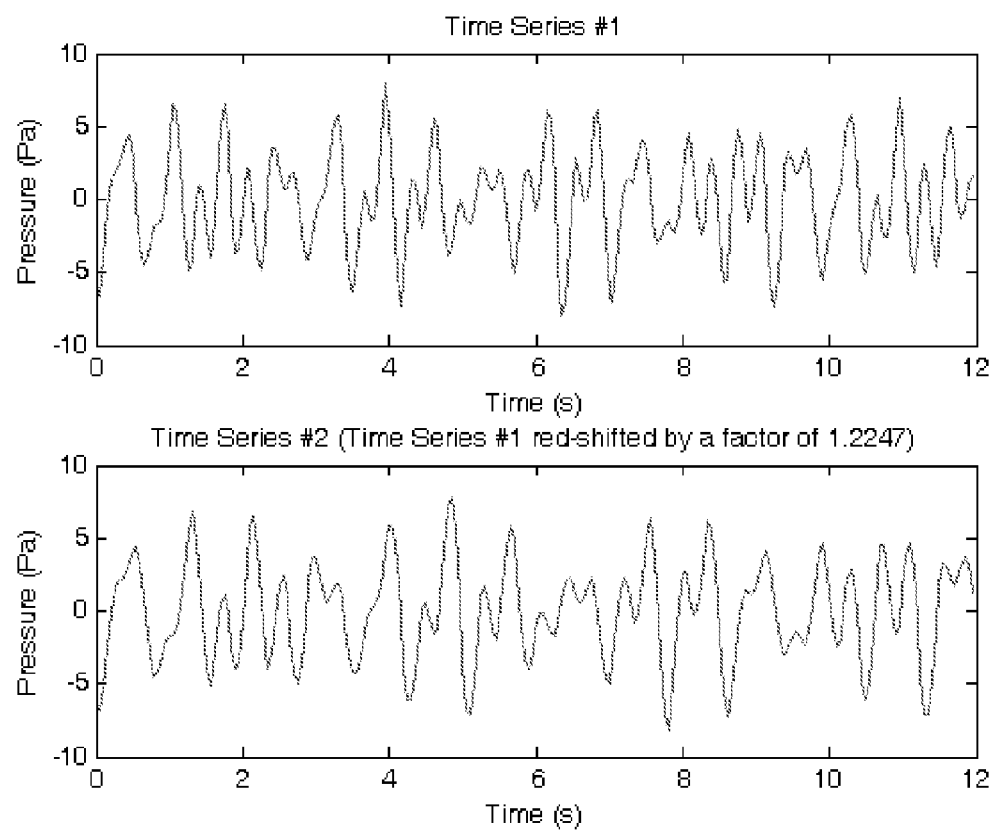
FIG. 9 is a time series constructed from the superposition of four sinusoidal waves (top panel) and the same time series after being red-shifted by a factor of 1.2247 (bottom panel).

FIG. 9 is a time series constructed from the superposition of four sinusoidal waves (top panel) and the same time series after being red-shifted by a factor of 1.2247 (bottom panel). Time series #1 in FIG. 9 (top panel) is a superposition of four sinusoidal waves. Time series #2 (bottom panel) was constructed by red-shifting time series #1 by a factor of 1.2247. This means that the wavelengths in time series #2 are 1.2247 times longer than those in time series #1, and the frequencies are reduced by a factor of 1.2247.

Figure 10:
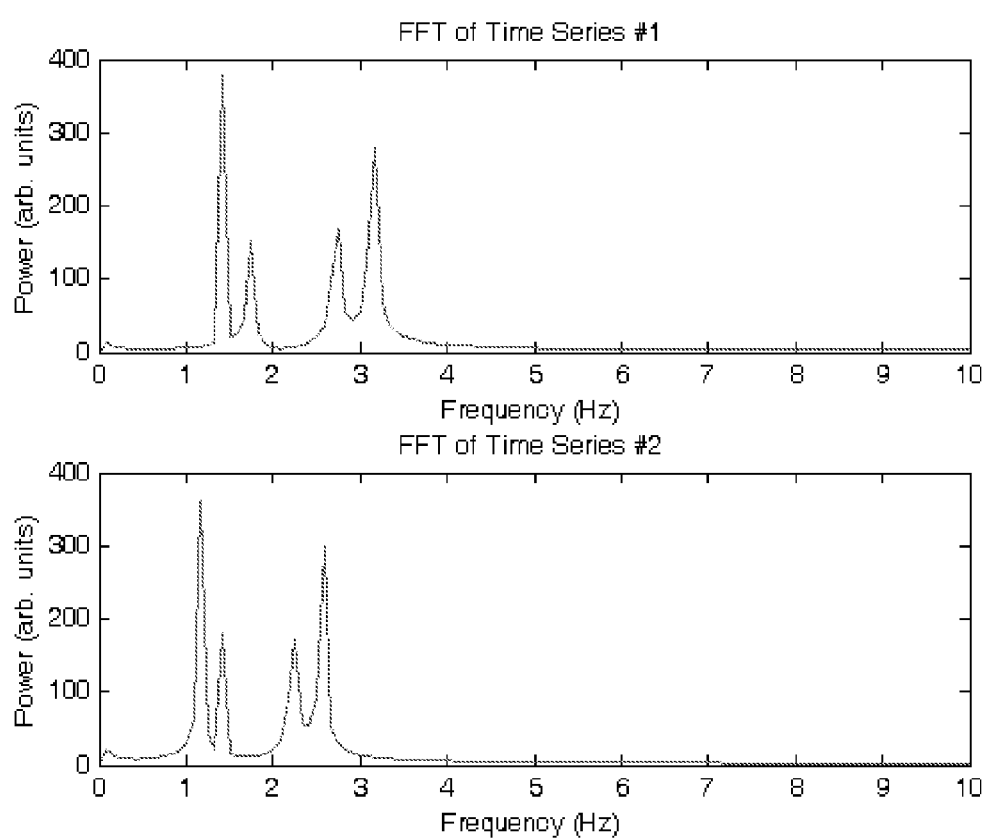
FIG. 10 is the Fast Fourier transform (FFT) of time series #1 and #2 (top and bottom panel, respectively).

FIG. 10 is the Fast Fourier transform (FFT) of time series #1 and #2 (top and bottom panel, respectively). The Fast Fourier transform (FFT) of both time series displayed in FIG. 10 clearly show the four frequencies that compose time series #1 (top panel) and the four reduced frequencies of time series #2 (bottom panel).

Figure 11:
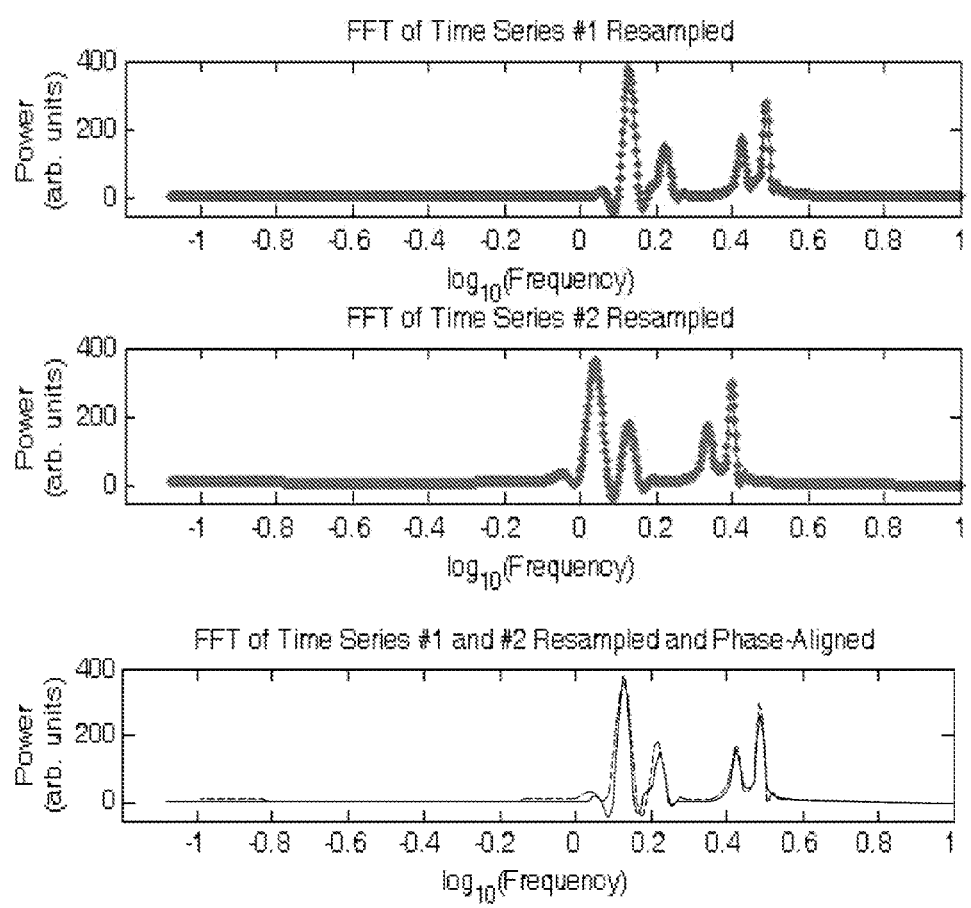
FIG. 11 is the FFT of time series #1 and #2 plotted on a $\log_{10}$(frequency) axis after resampling (top and middle panels, respectively), and aligning bottom panel.

The Fourier transform of both time series can be graphed as a function of log 10(frequency) and resampled to maintain equal spacing between samples in the new domain. In FIG. 11, the spacing between samples is ~2.08×10-3. Notice that in this logarithmic domain the result of red-shifting time series #2 materializes in the Fourier transform of time series #2 (middle panel) as a uniform shift in the location of the four major peaks in the Fourier transform of time series #1 (top panel). Therefore, the amount of red-shifting present in time series #2 relative to time series #1 can be estimated by determining how far the locations of these peaks have shifted. In this case, cross-correlation indicates that the Fourier transform of times series #2 needs to be shifted to the right by 43 samples (bottom panel, dashed line plot) to best match the Fourier transform of time series #1 (bottom panel, solid line plot).

FIG. 11 is the FFT of time series #1 and #2 plotted on a $\log_{10}$(frequency) axis after resampling (top and middle panels, respectively). Displayed in the bottom panel is a phase-aligned overlay of the FFTs presented in the two upper panels with the FFT of time series #2 shifted to the right by 43 samples (dashed line plot) to best match the FFT of time series #1 (solid line plot).

Therefore, it can be estimated that time series #2 was red-shifted with respect to time series #1 by a factor of approximately 1.229.

$$\log_{10}(f'_1) - \log_{10}(f'_2) \approx (\text{\# of samples}) \times (\text{sample spacing})$$

$$\log_{10}(f'_1) - \log_{10}(f'_2) \approx (43 \text{ samples}) \times (2.08 \times 10^{-3})$$

$$\log_{10}(f'_1) - \log_{10}(f'_2) \approx 0.0894$$

$$\frac{f'_1}{f'_2} \approx 10^{0.0894}$$

$$\frac{f'_1}{f'_2} \approx 1.229$$

$$f'_2 \approx \frac{1}{1.229} f'_1$$

It should be noted that, in general, more accurate estimates can be made by interpolating the FFT to reduce the sample spacing.

3. Example of Tracking

The methods and systems were applied to noisy data with a signal-to-noise ratio of 15 dB. The data were computer generated and simulated infrasound signals that might be recorded at four sensors if a source were moving at 15 m/s (~34 mi/hr) in a circular path with a 2 km radius. The array of four sensors consisted of one sensor at the center of the circular path, and the other three, each 1 km from the central sensor, distributed in the shape of an equilateral triangle.

Figure 12:
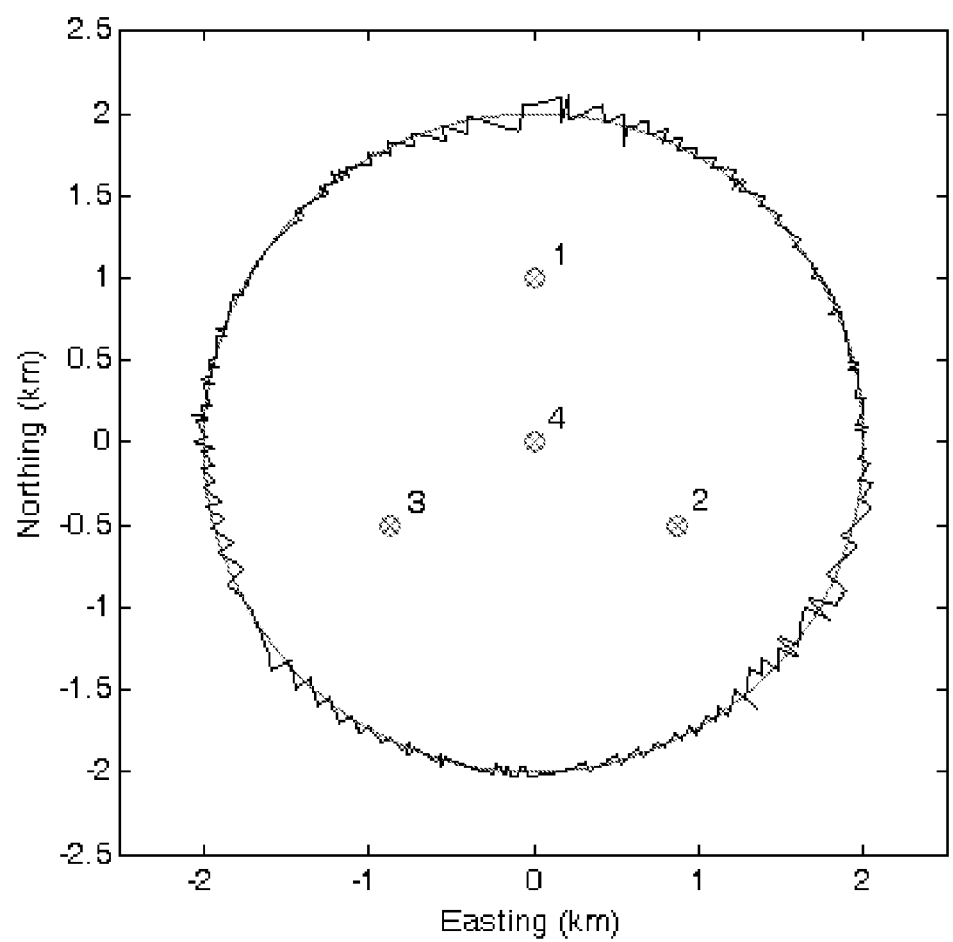
FIG. 12 illustrates application of the methods and systems to a case in which an infrasound source moved at 15 m/s (~34 mi/hr) along a circular path of radius of 2 km (large regular circle) enclosing four sensors (small circles with crosses).

A graphical representation of the simulation is displayed in the FIG. 12. The location of the four sensors are indicated by small circles with crosses. The large regular circle illustrates the actual path taken by the moving source in the simulation. The path of the moving source as estimated by the Source Tracker is shown as a large irregular circle. This example is presented merely to demonstrate proof of concept. In general, the error in the path estimated by this tracking procedure can be reduced using signal processing techniques such as interpolation of the data recorded by the sensors.

FIG. 12 illustrates application of the methods and systems to a case in which an infrasound source moved at 15 m/s (~34 mi/hr) along a circular path of radius of 2 km (large regular circle) enclosing four sensors (small circles with crosses). The time series recorded by the sensors were constructed by a computer simulation and then noise was added. Applying the Source Tracker to the noisy data resulted in an estimation of the path of the moving source (large irregular circular path).

iv. Overview—Optimization Technique Improvements

In another aspect, the improved methods and systems provided can automatically identify other corresponding event times by performing steps comprising:
1) Creating a window in each time series centered on the initial event times and with a time duration defined by software or by the user.
2) Using an optimization technique, estimate a set of time differences that corresponds to the signal arrival at all sensors from the same event. This is discussed in more detail below.
3) Stepping the window forward by a software or user defined amount. Use the results from the optimization associated with the previous window to "seed" the optimization of the current window.
4) Repeating steps 2 and 3 until the end of the data set is reached.
5) Repeating steps 2 through 3 again, but move the windows backward in time (starting from the initial event times from step 1), until the beginning of the data set is reached.
6) Using the time differences estimated at each iteration of the windows, estimate the location of the moving source at different points along its path.

1. Estimating Time Differences

The time differences corresponding to the same event recorded in multiple time series can be estimated by utilizing an optimization technique. The methods and systems provided can use one time series as a reference and apply an optimization technique to choose times at which to resample another time series in order to best match the reference time series.

Figure 13:
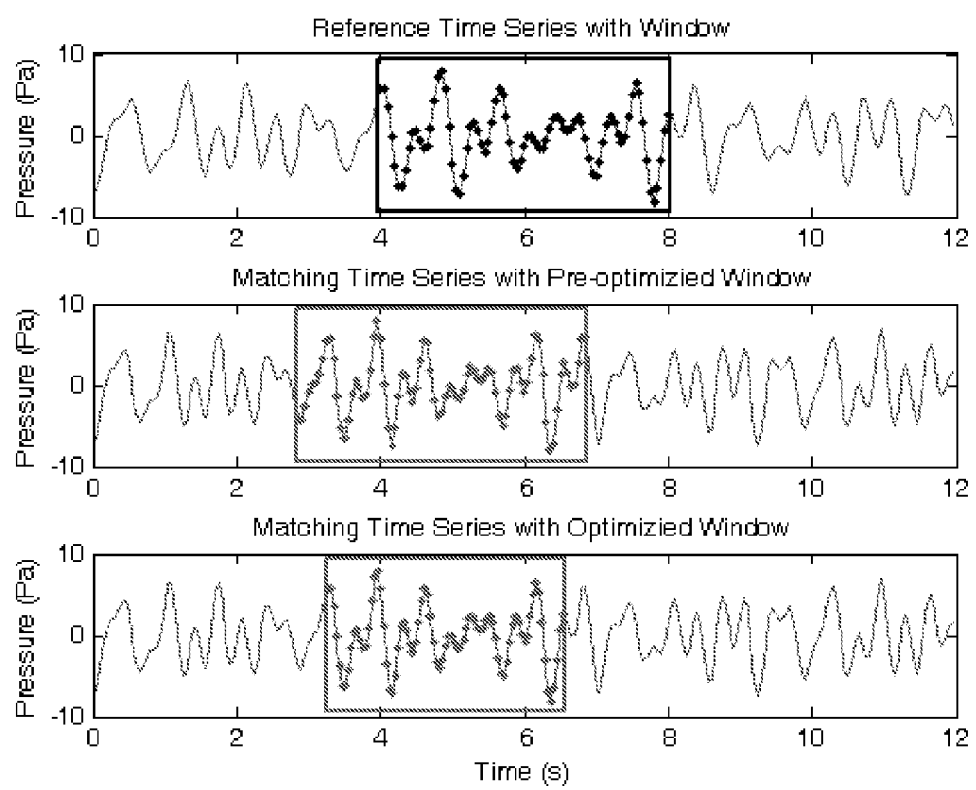
FIG. 13 is an example of using an optimization process to estimate time differences

An example of using an optimization process to estimate time differences is presented in FIG. 13. Two time series are displayed in the top and middle panels. The time series in the top panel is used as the reference time series in this example. A rectangle that extends from 4.0 to 8.0 seconds represents a window enclosing a segment of the reference time series to match. For clarity, the discrete values of the reference time series within the window have been marked with dots. Plotted in the middle panel is another time series which will be resampled in order to match the reference time series. The rectangle in the middle panel represents a 4 second window centered at 4.85 s that encloses a segment of the matching time series. The dots in the middle panel indicate the discrete values of the matching time series within the window. For this example, this window serves as the starting point, or "seed," for the optimization technique.

In order to take full advantage of the optimization technique, the matching time series now needs to be replaced by a continuous function that passes through every point in the original time series and that that can be evaluated at any time between samples. The continuous function used in this example is constructed in a piecewise fashion by first interpolating the matching time series by a factor of 100, then by connecting every consecutive pair of resulting points by a line segment.

The optimization technique is allowed to translate (or move) the window and to change the time duration of the window (stretch and compress the window). As the window translates, the times at which the continuous function are evaluated translate by the same amount. As the window increases or decreases in time duration, the interval between the times at which the continuous function is evaluated changes accordingly by the same factor such that the number of samples within the window remains constant. The optimization method ultimately tries to find the window size and position that correspond to the best match between the samples within this window and the samples within the reference window. For this example, the best match between sets of samples was defined mathematically as the match that minimized the sum of the squares of the differences between the sample sets.

The optimized window, which resulted from a Nelder-Mead method, is shown in the bottom panel of FIG. 13 as a rectangle. The set of samples of the continuous function that were found to best match the samples in the reference window are plotted with dots. The optimized window is centered at 4.899 s and is 3.266 s in duration. These results indicate that the same event recorded in the reference time series at 6.0 s (center of the reference window) would have been recorded at approximately 4.899 s in the matching time series. Furthermore, near the center of these windows the reference time series is red-shifted relative to the matching time series by a factor of approximately 1.225 (4/3.266).

As shown in FIG. 13, to estimate time differences between the same event recorded in two time series, the Source Tracker uses one time series as a reference. An optimization technique is then applied to the other time series to find a window that best matches the contents of a given window in the reference time series (top panel, rectangle and dots). Starting with a "seed" window (middle panel, rectangle and dots), an optimized window is found (bottom panel, rectangle and dots) such that the data within the optimized window best matches the data in the reference window.

2. Example of Tracking

The methods and systems were applied to noisy data with a signal-to-noise ratio of 15 dB. The data were computer generated and simulated infrasound signals that might be recorded at four sensors if a source were moving at 15 m/s (~34 mi/hr) in a circular path with a 2 km radius. The array of four sensors consisted of one sensor at the center of the circular path, and the other three, each 1 km from the central sensor, distributed in the shape of an equilateral triangle.

Figure 14:
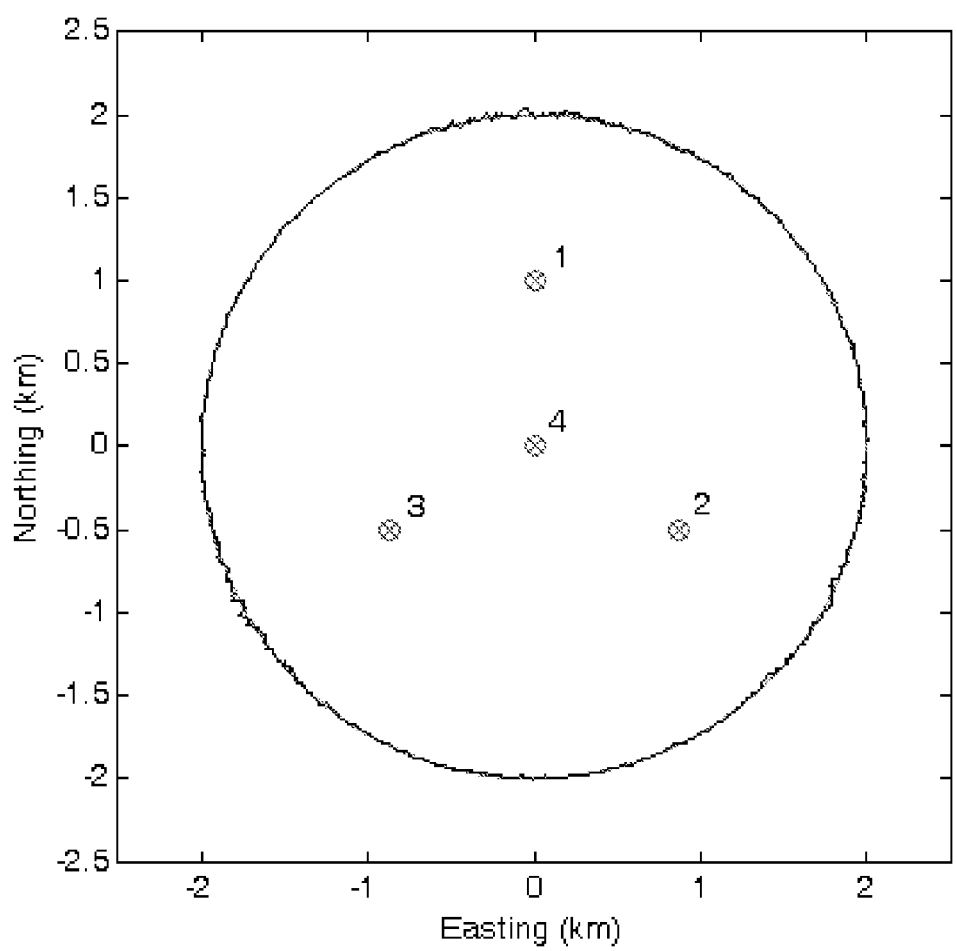
FIG. 14 illustrates application of the method and systems to a case in which an infrasound source moved at 15 m/s (~34 mi/hr) along a circular path of radius of 2 km (large regular circle) enclosing four sensors (small circles with crosses).

A graphical representation of the simulation is displayed in the FIG. 14. The location of the four sensors are indicated by small circles with crosses. The large regular circle illustrates the actual path taken by the moving source in the simulation. The path of the moving source as estimated by the Source Tracker is shown as a large irregular circle. This example is presented merely to demonstrate proof of concept. In general, the error in the path estimated by this tracking procedure can be reduced using signal processing techniques such as interpolation of the data recorded by the sensors.

FIG. 14 illustrates application of the method and systems to a case in which an infrasound source moved at 15 m/s (~34 mi/hr) along a circular path of radius of 2 km (large regular circle) enclosing four sensors (small circles with crosses). The time series recorded by the sensors were constructed by a computer simulation and then noise was added. Applying the methods and systems to the noisy data resulted in an estimation of the path of the moving source (large irregular circular path).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method for source tracking comprising:
   a. receiving a signal from a moving signal source at each of a plurality of sensors in a sensor array;
   b. determining a data set of time series comprising data points representing when the signal was received at each of the plurality of sensors;
   c. receiving an identification of a set of times that correspond to a first event recorded by all of the plurality of sensors; and
   d. approximating a path of the moving signal source by estimating the location of each event subsequent to the first event by a path-approximation unit, wherein approximating the path of the moving signal source by estimating the location of each event subsequent to the first event comprises:
      1. determining an amount of red-shifted data points and an amount of blue-shifted data points,
      2. creating a window in each time series centered on the first event time and with a time duration defined by software or by the user,
      3. estimating an amount of Doppler shift present in each window relative to the most red-shifted data points,
      4. resizing the windows such that the windows containing the most blue-shifted data points shrink the most, but the window containing the most red-shifted data points does not change in size,
      5. resampling the data points in each resized window such that the number of data points in each window is the same, wherein the presence of Doppler shifting is removed from the data points in the windows,
      6. dividing the plurality of sensors into sensor pairs,
      7. cross-correlating the data points in all windows of step 4 to estimate time differences of arrival of the signal between each pair of sensors,
      8. moving all windows of step 4 forward in time by a step size defined by software or by the user, wherein the centers of the windows have time differences that reflect the result of step 7,
      9. repeating steps 3 through 8 until the end of the data set is reached,
      10. repeating steps 3 through 7 again, moving the windows backward in time starting from the initial event times from step 2, until the beginning of the data set is reached, and
      11. using the time differences estimated at each iteration of the windows, estimating a location of the moving signal source at different points along the moving signal source path.

2. The method of claim 1, wherein approximating a path of the moving signal source by estimating the location of each event subsequent to the first event comprises:
   1. receiving a signal from a moving signal source at each of a plurality of sensors in a sensor array;
   2. determining a data set of time series comprising data points representing when the signal was received at each of the plurality of sensors;
   3. receiving an identification of a set of times that correspond to a first event recorded by all of the plurality of sensors; and
   4. approximating a path of the moving signal source by estimating the location of each event subsequent to the first event.

3. The method of claim 1, wherein the signal comprises a Doppler shifted signal.

4. The method of claim 1, wherein the signal is comprised of one of an acoustic signal or an electro-magnetic signal.

5. The method of claim 4, wherein the sensor array comprises four sensors.

6. A system for source tracking comprising:
   a. a plurality of sensors in a sensory array for receiving a signal from a moving signal source; and
   b. a tracking unit, in communication with the plurality of sensors, comprising
      a sensor data receiving unit configured to receive signal data from the plurality of sensors,
      a location and time determination unit configured to determine a data set of time series comprising data points representing when the signal was received at each of the plurality of sensors, and
      an input unit configured to receive an identification of a set of times that correspond to a first event recorded by all of the plurality of sensors, and
      a path approximation unit configured to approximate a path of the moving signal source by estimating the location of each event subsequent to the first event, wherein the path approximation unit is configured to perform the steps comprising:
1. determining an amount of red-shifted data points and an amount of blue-shifted data points,
2. creating a window in each time series centered on the first event time and with a defined time duration,
3. estimating an amount of Doppler shift present in each window relative to the most red-shifted data points,
4. resizing the windows such that the windows containing the most blue-shifted data points shrink the most, but the window containing the most red-shifted data points does not change in size,
5. resampling the data points in each resized window such that the number of data points in each window is the same, wherein the presence of Doppler shifting is removed from the data points in the windows,
6. dividing the plurality of sensors into sensor pairs,
7. cross-correlating the data points in all windows of step 4 to estimate time differences of arrival of the signal between each pair of sensors,
8. moving all windows of step 4 forward in time by a defined step size, wherein the centers of the windows have time differences that reflect the result of step 7,
9. repeating steps 3 through 8 until the end of the data set is reached,
10. repeating steps 3 through 7 again, moving the windows backward in time starting from the initial event times from step 2, until the beginning of the data set is reached, and
11. using the time differences estimated at each iteration of the windows, estimating a location of the moving signal source at different points along the moving signal source path.

7. The system of claim 6, wherein the path approximation unit is configured to perform the steps comprising:
1. receiving a signal from a moving signal source at each of a plurality of sensors in a sensor array;
2. determining a data set of time series comprising data points representing when the signal was received at each of the plurality of sensors;
3. receiving an identification of a set of times that correspond to a first event recorded by all of the plurality of sensors; and
4. approximating a path of the moving signal source by estimating the location of each event subsequent to the first event.

8. The system of claim 6, wherein the signal comprises a Doppler shifted signal.

9. The system of claim 6, wherein the signal is comprised of one of an acoustic signal or an electro-magnetic signal.

10. The system of claim 9, wherein the sensor array comprises four sensors.

11. A non-transitory computer readable medium with computer executable instructions embodied thereon for source tracking comprising:
a. receiving a signal from a moving signal source at each of a plurality of sensors in a sensor array;
b. determining a data set of time series comprising data points representing when the signal was received at each of the plurality of sensors;
c. receiving an identification of a set of times that correspond to a first event recorded by all of the plurality of sensors; and
d. approximating a path of the moving signal source by estimating the location of each event subsequent to the first event by a path-approximation unit, wherein approximating the path of the moving signal source by estimating the location of each event subsequent to the first event comprises:
1. determining an amount of red-shifted data points and an amount of blue-shifted data points,
2. creating a window in each time series centered on the first event time and with a defined time duration,
3. estimating an amount of Doppler shift present in each window relative to the most red-shifted data points,
4. resizing the windows such that the windows containing the most blue-shifted data points shrink the most, but the window containing the most red-shifted data points does not change in size,
5. resampling the data points in each resized window such that the number of data points in each window is the same, wherein the presence of Doppler shifting is removed from the data points in the windows,
6. dividing the plurality of sensors into sensor pairs,
7. cross-correlating the data points in all windows of step 4 to estimate time differences of arrival of the signal between each pair of sensors,
8. moving all windows of step 4 forward in time by a defined step size, wherein the centers of the windows have time differences that reflect the result of step 7,
9. repeating steps 3 through 8 until the end of the data set is reached,
10. repeating steps 3 through 7 again, moving the windows backward in time starting from the initial event times from step 2, until the beginning of the data set is reached, and
11. using the time differences estimated at each iteration of the windows, estimating a location of the moving signal source at different points along the moving signal source path.

12. The non-transitory computer readable medium of claim 11, wherein approximating a path of the moving signal source by estimating the location of each event subsequent to the first event comprises:
1. receiving a signal from a moving signal source at each of a plurality of sensors in a sensor array;
2. determining a data set of time series comprising data points representing when the signal was received at each of the plurality of sensors;
3. receiving an identification of a set of times that correspond to a first event recorded by all of the plurality of sensors; and
4. approximating a path of the moving signal source by estimating the location of each event subsequent to the first event.

13. The non-transitory computer readable medium of claim 11, wherein the signal comprises a Doppler shifted signal.

14. The non-transitory computer readable medium of claim 11, wherein the signal is comprised of one of an acoustic signal or an electro-magnetic signal.

15. The non-transitory computer readable medium of claim 14, wherein the sensor array comprises four sensors.

* * * * *